Figure 1:
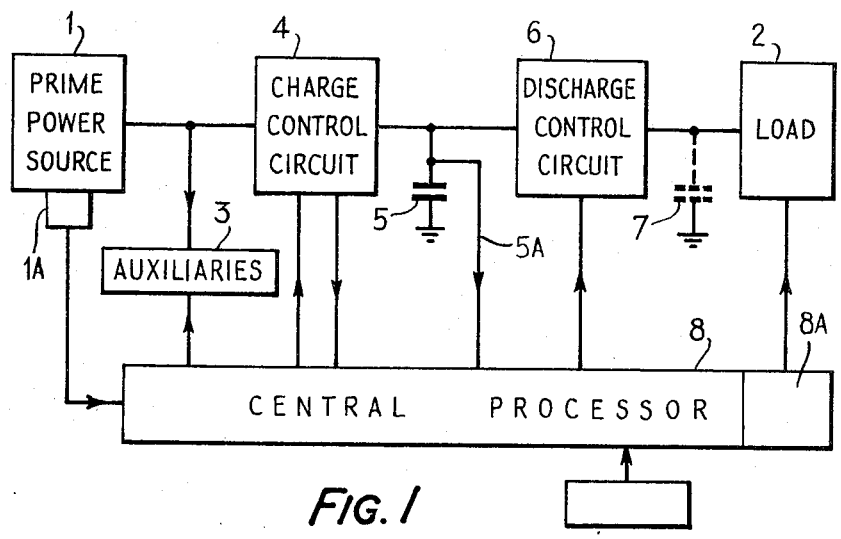

United States Patent [19]

Molyneux-Berry

[11] 4,274,132
[45] Jun. 16, 1981

[54] POWER SUPPLY ARRANGEMENTS

[75] Inventor: Robert B. Molyneux-Berry, Danbury, England

[73] Assignee: The Marconi Company Limited, Chelmsford, England

[21] Appl. No.: 12,727

[22] Filed: Feb. 16, 1979

[30] Foreign Application Priority Data

Feb. 18, 1978 [GB] United Kingdom ................ 6517/78

[51] Int. Cl.³ .......................................... H02M 3/335
[52] U.S. Cl. ........................................ 363/21; 363/79; 363/97; 455/127; 455/343
[58] Field of Search ................... 323/258, 267; 363/21, 363/95, 96, 79; 455/127, 343

[56] References Cited

U.S. PATENT DOCUMENTS

| 3,564,393 | 2/1971 | Williamson | 363/21 X |
|---|---|---|---|
| 3,579,111 | 5/1971 | Johannessen et al. | 455/127 X |
| 3,590,361 | 6/1971 | Bishop et al. | 363/21 |
| 3,984,799 | 10/1976 | Fletcher et al. | 363/21 |
| 4,087,850 | 5/1978 | Koizumi | 363/21 |
| 4,180,852 | 12/1979 | Koizumi et al. | 363/21 X |
| 4,189,764 | 2/1980 | Snyder | 363/21 |

FOREIGN PATENT DOCUMENTS

| 2608167 | 9/1977 | Fed. Rep. of Germany | 363/21 |
|---|---|---|---|
| 2719290 | 11/1978 | Fed. Rep. of Germany | 363/21 |

Primary Examiner—William M. Shoop
Attorney, Agent, or Firm—Diller, Ramik & Wight

[57] ABSTRACT

In an arrangement in which a power source is required to supply energy to a load requiring at times more energy than can consistently be drawn from the source: the invention provides 1. A charge control circuit which controls the charging of an energy store from a power source,
2. A discharge control circuit which controls the amount of energy supplied to the load from the energy store and
3. A processor which receives information concerning the state of the power supply and the energy store and which controls 1 and 2 above accordingly.

10 Claims, 4 Drawing Figures

POWER SUPPLY ARRANGEMENTS

This invention relates to power supply arrangements and in particular to arrangements in which a power source is required to supply energy to a load, for example, a radio transmitter valve, which is required to be supplied with energy at times greater than that which may normally be drawn from the source.

One object of the present invention is to provide improved such arrangements.

According to this invention a power supply arrangement in which a power source is connected to supply a load comprises reservoir storage means arranged to be charged via a charge control circuit from said source and to supply said load via a discharge control circuit and a processor programmed and arranged to monitor the state of said power source to determine its capability for providing power to said reservoir storage means and to control said charge control circuit to achieve optimum charging thereof and to control said discharge control circuit to supply power to said load as required and consistent with the state of charge of said all reservoir storage means and the capability of said power source.

Commonly said load is such that the power requirements thereof may at times exceed the power rating of said source, for example, a radio transmitting valve.

Where in addition to said load said power source is connected to supply power to auxiliary equipments, preferably said processor is arranged to control the operation of an auxiliary (such as a cooling blower motor) and to switch this off where the power supplied thereto is required for said load and circumstances permit.

Said processor may be arranged to control said charge control circuit in such manner that power is supplied to said load, or the power level of the power supplied to said load is increased, in pulse form. In this last mentioned case, said processor may control the amount of energy in a pulse and/or the pulse repetition rate and/or pattern in dependence upon the tasks to be performed by said load and may on the basis of the state of charge of said reservoir capacitor means and the capability of said power source, reduce delay or sequence the tasks to be performed by said load in accordance with an order of priority and consistent with the power available.

Preferably said discharge control circuit comprises a flyback inverter circuit including at least one inductive element connected to be charged from said reservoir storage means by a switch, when said switch is closed directly or indirectly under the control of said processor, and arranged such that the charge in said inductive member is transferred to said load as said switch is opened under the control, direct or indirect, of said processor.

In one embodiment of the invention said flyback inverter circuit is in accordance with the invention in our co-pending application 3941/78.

Preferably said processor is arranged to close said switch or the switches in said flyback inverter circuit following a pulse of energy applied to said load and flyback inverter action is initiated in order to replenish said reservoir storage means on a pulse to pulse basis.

Commonly said load will be provided with a temporary storage means from which said load draws energy as required and which is charged by said discharge control circuit.

Figure 2:
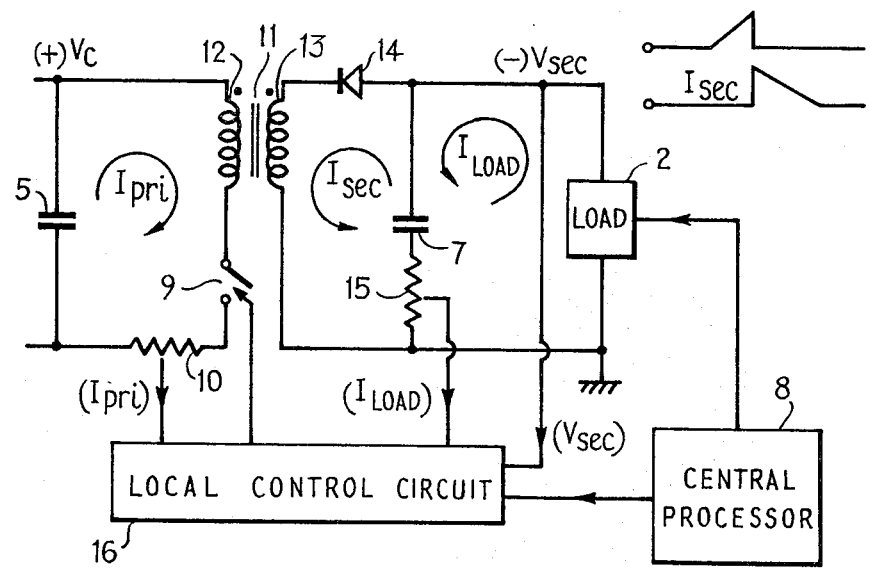
Figure 3:
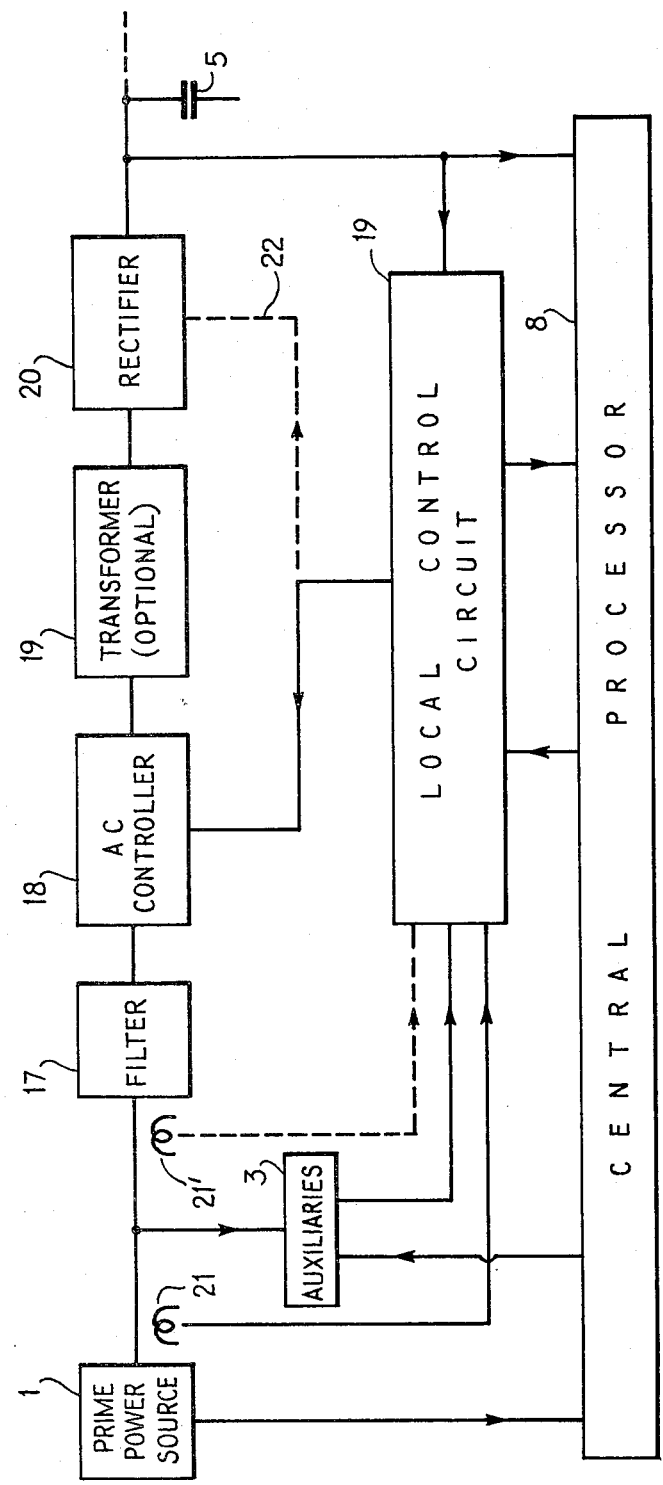
Figure 4:
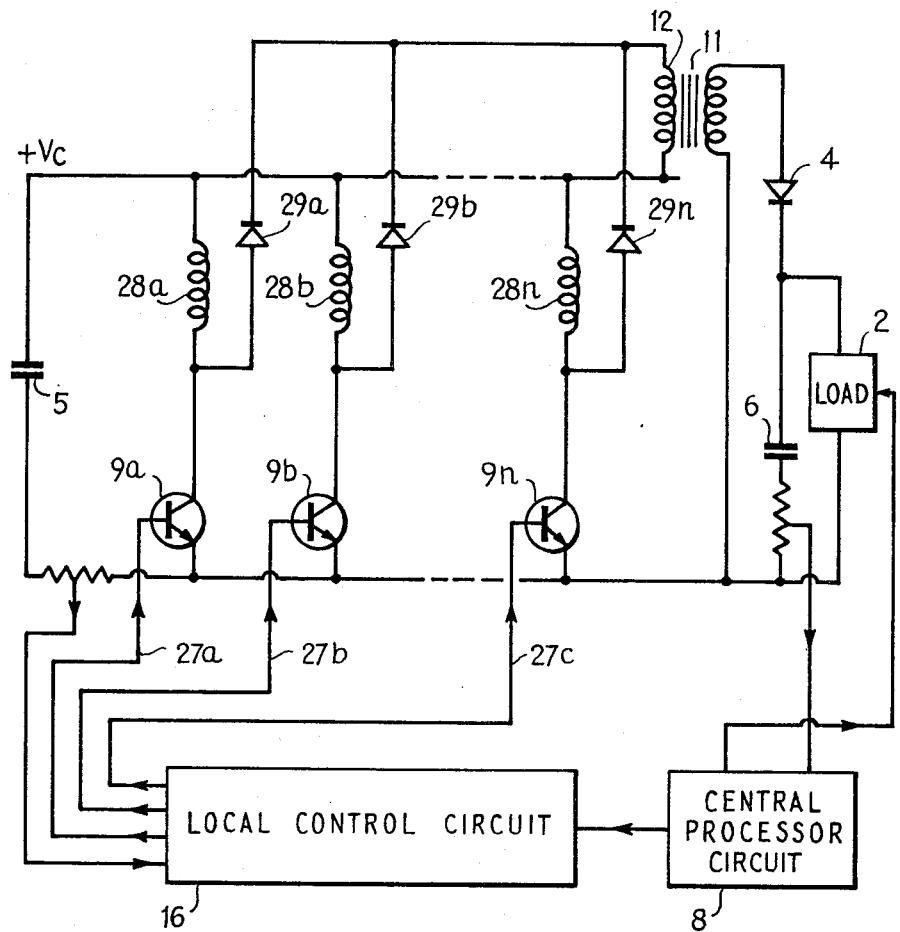

The invention is illustrated in and further described with reference to the accompanying drawings in which, FIG. 1 is a block schematic diagram of a power supply arrangement in accordance with the present invention, FIG. 2 is a block schematic diagram of the discharge control circuit 6 of FIG. 1, FIG. 3 is a block schematic diagram of the charge control circuit 4 of FIG. 1 and FIG. 4 is a block schematic diagram of another form of discharge control circuit 6 of FIG. 1.

Referring to FIG. 1, a prime power source 1 is required to supply energy to a load 2, for example a transmitter valve, which is required to be supplied with energy at times greater than that which may be drawn from the source 1. For example the load may be required to be supplied with a pulse or a sequence of pulses individually of an energy level greater than that which can be drawn normally from the source 1.

The power source 1, in this instance is also required to supply energy to auxiliary equipment such as cooling blowers represented collectively by the block 3.

In order to supply the load 2, the source 1 is connected to charge, via a charge control circuit 4, a reservoir capacitor 5 whilst the load is connected to draw energy from the reservoir capacitor 5 via a discharge control circuit 6. A further reservoir capacitor, as represented in dashed outline at 7, may be provided to act as a temporary reservoir for the load 2.

A central processor 8 is provided to control the system. Processor 8 produces a control signal which controls discharge control circuit 6 to determine the nature of the energy supplied to the load. If to be pulsed, the processor 8 controls the amount of energy per pulse and the pulse repetition rate and pattern. The load may be pulsed with a single pulse or a burst of pulses. Controlled by the processor 8 these criteria may be varied in an agile manner. Processor 8 also produces control signals which control the charge rate of the charge controlling circuit 4 and control the operation of the auxiliary equipments 3. Processor 8 is also connected to receive a monitor signal from monitoring means 1A associated with the power source 1. This enables the processor 8 to monitor the state of the power source 1 (for example its temperature) and the extent of the other demands upon it (by the auxiliaries for example). The processor 8 receives a further monitor signal along line 5A which enables the processor to monitor the voltage level on the storage capacitor 5.

The central processor 8 is arranged to control the charge controlling circuit 4 so that the reservoir capacitor 5 is recharged at the maximum rate practicably consistent with the state of, and other demands upon (for example by the auxiliary equipments 3), the power source 1 and up to a maximum voltage beyond which further charging is undesirable.

The system normally runs in a "stand by" or "low power" mode in which the power supplied to the load 2 is less than the net power available from the power source 1. In the case of a transmitting valve this will represent the normally driven state. Any surplus power whilst the system is operating in this mode will replenish the charge in reservoir capacitor 5, if necessary.

The central processor 8 from its monitoring of the voltage level on the storage capacitor 5 is arranged to compute the available energy stored. The central processor 8 is also arranged to compute the rate at which the storage capacitor 5 may be replenished having regard to the net power available from the power source 1 as determined by the monitored state of the power source 1 and the extent of the other demands upon it.

The central processor 8 includes means, represented schematically at 8A, which defines the desired power consumption of the load and instructs the load 2 to operate at high power or in a burst mode in order to carry out a task or tasks for which high power is necessary. Discharge controlling circuit 6 is also programmed by the central processor 8 to make the necessary energy available to the load 2 having first computed that the necessary energy is available in the reservoir capacitor 5 or from prime power source 1 or from both.

In the event that the central processor 8 computes that there is insufficient energy immediately available to meet the requirements defined at 8A for the required task or tasks, the processor is arranged to reduce, delay or sequence the tasks according to an appropriate order of priority so that these can be achieved with the energy available.

If a high priority task is urgently required at times when the energy immediately available is not sufficient to carry out this task, the central processor 8 is arranged temporarily to cause certain of the auxiliaries 3 (e.g. blower motors) to be switched off so that more power is available from the source 1 for the load 2 or to replenish the reservoir capacitor 5 rapidly.

The reservoir capacity 5 may be of any conventional type, including electrolytic. Its approximate capacity C must be known in order for its energy content to be computed. If it is rated at a maximum charge voltage of $V_{C1}$, and if the discharge controlling circuit 6 can usefully withdraw energy until this voltage has fallen to some lower level $V_{C2}$, the available energy which may be stored is given by $\frac{1}{2}(V_{C1}^2 - V_{C2}^2)C$. Thus for example, if $V_{C1} = 2V_{C2}$, then three-quarters of the maximum gross energy store ($=\frac{1}{2}CV_{C1}^2$) is available for immediate use.

There are a number of forms which discharge controlling circuit 6 may take. One example is illustrated in FIG. 2.

Referring to FIG. 2, the reservoir capacitor 5 is connected, in series with an electronic switch 9 and a current monitoring resistor 10, in the primary circuit of a transformer 11, so that when switch 9 is closed (i.e. rendered conductive) the charge in capacitor 5 is applied across the primary winding 12 of transformer 11.

The secondary winding 13 of transformer 11 is connected in series with a rectifier 14 across the load 2. In this case temporary reservoir capacitor 7 is provided and is thus represented in solid line. Capacitor 7 is connected in series with a current monitoring resistor 15 across the load 2.

The circuit configuration of FIG. 2 as so far described, ignoring current monitoring resistors 10 and 15, is a flyback inverter circuit as known per se. In operation, as switch 9 is closed the charge in reservoir capacitor 5 is applied across the primary winding 12. Transformer 11 is so polarised that the voltage on its secondary winding 13 reverse biasses rectifier 14 which prevents the flow of secondary current. Current builds up in the primary winding 12 at a rate dependent upon its value of inductance until switch 9 is opened (i.e. rendered non-conductive). The energy stored in the primary winding 12 transfers to the secondary winding 13 and rectifier 14 now conducts so that the energy is transferred to the temporary reservoir capacitor 7 and the load 2.

Switch 9 is controlled by a local control circuit 16 which is linked to the central processor 8. Local control circuit also monitors the primary current ($I_{pri}$) passing through monitoring resistor 10; the load current ($I_{load}$) passing through monitoring resistor 15 and the voltage ($V_{sec}$) on the load 2.

As switch 9 is closed by the local control circuit 16, under the command of central processor the primary current increases from an initial value (in this case usually zero) approximately according to the formula:

$$dI_{pri}/dt = (-)(V_C/L)$$

Switch 9 remains closed until local control circuit 16 detects that the primary current $I_{pri}$ has reached a certain desired value. Thereupon local control circuit 16 opens switch 9 to interrupt the primary current. At this instant primary winding 12 has stored energy equal to $\frac{1}{2}L(I_{pri})^2$.

This energy is inductively transferred to the secondary winding 13 causing the secondary current $I_{sec}$ to flow. The magnitude of this last mentioned current depends on the turns ratio of the transformer 11. Current $I_{sec}$, and the energy transformed from the primary, are together used to supply the load or to replenish the charge stored on the capacitor 7. When back-e.m.f. has caused secondary current $I_{sec}$ to die away, the energy transfer cycle is complete and the system is again electrically at rest. Rectifier R prevents capacitor 7 from discharging back into the transformer.

In the arrangement shown in FIG. 2, the capacitor 7 is pre-charged to a level which enables the load 2 to respond correctly to the commands of the central processor 8 for one pulse or cycle. Immediately following this pulse or cycle, capacitor 7 is replenished by closing switch 9 and initiating flyback inverter action in order to be ready to respond correctly for the next pulse or cycle. Where successive pulses or cycles are equal and follow repetitively, comprising a steady mean load, the voltage $V_{sec}$ on the load is used by the local control circuit 16 to set the value at which the primary current $I_{pri}$ is interrupted using conventional negative-feedback techniques except that the square-law inherent in energy storage in inductors (energy = $\frac{1}{2}L(I_{pri})^2$) is allowed for in comparing the amplified error signal derived from $V_{sec}$ (and a reference voltage) with the voltage signal derived from $I_{pri}$ in order to determine the correct instant of current interruption.

This type of feedback, however, suffers from the known limitation that the loop gain must fall off with frequency and must be reduced to unity at half the pulse repetition frequency of the inverter system in order to prevent self oscillation; it cannot give satisfactory stability when the load power varies substantially in bursts, or from cycle to cycle.

To overcome the limitation, two other methods are hereafter described which may be used separately or in combination.

The simplest of these two methods is to cause the central processor 8 to programme the local control circuit 16 with the estimated energy demand of the load 2, which is also under the control of the processor 8. The local control circuit 16 interrupts the primary current $I_{pri}$ at a level calculated to supply this energy demand. This is an open-loop system and does not lead to feedback instability difficulties, but it is subject to random and progressive errors which can integrate over numbers of pulses or cycles causing $V_{sec}$ to drift to an unacceptable level. Since, however, this drift can be kept slow providing the estimating circuits are of reasonable accuracy, the drift may be corrected, and $V_{sec}$ stabilized, by application of the conventional feedback system described above acting to complement the energy estimating system.

The second of the two methods above referred to is for the local control circuit 16 to measure the charge extracted from the temporary reservoir capacitor 7 at each cycle or pulse, and to replace it as accurately as possible, drift due to cummulative errors being corrected by the conventional feedback system as described above. The charge extracted from capacitor 7 is determined by integrating the voltage across current monitoring resistor 15.

Because of the square-law calculations necessary, in practice the local control circuit 16 will need to perform some of the functions of a simple pocket calculator in order to maintain maximum accuracy of metering as current $I_{pri}$ varies.

Referring to FIG. 3, this illustrates one form which the charge controlling circuit 4 of FIG. 1 may take. Energy from the prime power source 1 is applied via a filter 17 to an a.c. controller 18, which is controlled by a local control circuit 19. Local control circuit 19 is linked to the central processor 8. Local control circuit 19 is also connected to monitor the energy available from the prime power source 1.

Output from the a.c. controller 18 is applied via a transformer 19 and a rectifier 20 to the reservoir capacitor 5. The local control circuit 19 is connected to monitor the charge of the reservoir capacitor 5 and is arranged to generate suitable trigger and control waveforms for supply to the a.c. controller 18, which includes triacs. Local control circuit 19 also contains a simple feedback amplifier for measuring the a.c. current passing to the reservoir capacitor 5 and adjust the triac trigger signals to maintain this current at a desired value. Feedback of the voltage $V_C$ on the reservoir capacitor 5 is also used to prevent a damaging surge when first switching on and to prevent further charging of the reservoir capacitor 5 when the charge thereon has attained a maximum desired level.

The local control circuit 19 monitors the output current of the prime power source 1 by means of a current transformer 21 shown adjacent the output of the source 1. In cases where the power source 1 is remote the current transformer 21 may be located anywhere within the path between source 1 and controller 18, but if located beyond the supply point for the auxiliaries 3 at 20', for example, some input (e.g. microswitches) will be necessary from selected ones of the auxiliaries 3 (e.g. the thermostatically controlled blower) to enable the local control circuit 19 to take advantage of any additional available power input.

The feedback amplifier in the local control circuit 19 acts to maintain the level of output current monitored at the maximum rated value by adjusting the rate of charge of the reservoir capacitor 5. In the event of an urgent priority task or tasks as well as central processor 8 being arranged to act to increase current flow into the reservoir capacitor 5 by temporarily switching off inessential ones of the auxiliaries 3, thus releasing more current for replenishment of the charge in reservoir capacitor 5, in addition, the central processor 8 is arranged to be capable of instructing the local control circuit 19 temporarily to overload the prime power source 1 by raising the reference voltage against which the current is compared. As previously mentioned the state (e.g. temperature) of the source 1 is monitored by the central processor 8 to enable it to decide whether or not such overloading of the source 1 is acceptable.

The central processor 8 receives information concerning the rate of replenishment of the charge in reservoir capacitor 5 from the current transformer 20 or 21' via the local control circuit 19. Also the central processor 8 computes the available energy stored in C using the formula Energy = $\frac{1}{2}C(V_C^2 - V_{C2}^2)$.
where
C is the known capacitance of capacitor 5
$V_C$ is the measured voltage on capacitor 5 at any time
$V_{C2}$ is the known minimum voltage at which the discharge controller 4 can efficiently withdraw useful energy from capacitor 5.

From the above information, and from knowledge of the maximum available energy which can effectively be stored in capacitor 5 when it is fully charged to voltage $V_{C1}$, the central processor 8 is enabled to estimate the total available energy at any appropriate time in the near future and is enabled to compare this amount of energy with the estimated amounts required by the load 2 in order to perform high power tasks at the command of the central processor 8. The central processor 8 may select, modify or schedule such tasks so that they may with certainty be performed within the limits of the available energy.

The central processor 8 is arranged to control the load 2 by commanding it to operate in specific high power, low power or stand by to perform tasks or to conserve energy. Central processor 8 also programmes the discharge control circuit 6 to make available to the load 2 the correct amount of energy for each type of duty.

The central processor 8 may form part of a large processor where such is provided for other duties in a larger overall system.

A modification is illustrated in FIG. 3. The dotted connection 22 represents an alternative means of controlling the charge applied to the reservoir capacitor 5. This represents a connection direct from the local control circuit 19 to the rectifier circuit 20 where the rectifier circuit 20 is composed of silicon control rectifiers so that the functions of control and rectification are combined. In this case the a.c. controller 18 would be omitted.

Furthermore, in connection with the charge control circuit illustrated in FIG. 2, as a further modification this may be arranged as illustrated in FIG. 4.

Referring to FIG. 4, it will be seen that the secondary and load circuit of the inverter is identical to that shown in FIG. 2. In place of the single switch 9, however, a plurality n of switches $9_a, 9_b - - - 9_n$, each represented as a transistor switch, are provided each connected with its emitter/collector path in series with a respective inductor $28_a, 28_b - - - 28_n$ across the reservoir capacitor 5. The base electrode of each of the transistors $9_a, 9_b - - - 9_n$ is connected to a respective trigger lead $27_a, 27_b - - - 27_n$ from local control circuit 16 so that any or all of the transistors $9_a, 9_b - - - 9_n$ may be triggered into conduction as required.

Each inductor $28_a, 28_b - - - 28_n$ is connected across the primary winding 12 of the transformer 11 via a respective rectifier $29_a, 29_b - - - 29_n$. The rectifiers $29_a, 29_b - -$

- $29_n$ are reversed biassed so that when the respective transistors $9_a$, $9_b$ - - - $9_n$ conducts, current builds up in each of the respective inductors $28_a$, $28_b$ - - - $28_n$.

In the operation of the circuit of FIG. 4 when any one of the transistors $9_a$, $9_b$ - - - $9_n$ are caused to conduct by a drive pulse applied to its respective trigger lead $27_a$, $27_b$ - - - $27_n$ the voltage $V_c$ across capacitor 5 is applied across its respective inductor $28_a$, $28_b$ - - - $28_n$ and, due to the reverse biassing of the diodes $29_a$, $29_b$ - - - $29_n$, current builds up in the respective inductors $28_a$, $28_b$ - - $28_n$. At the end of the drive pulse, energy stored in the respective inductor $28_a$, $28_b$ - - - $28_n$ is transferred via its respective rectifier $29_a$, $29_b$ - - - $29_n$ to the primary winding 12 of the transformer 11. The remainder of the circuit of FIG. 4 operates as already described with reference to FIG. 2.

It will be noted that with the inverter of FIG. 4 the power handling capability can be increased by adding transistor stages such as $9_a$, $9_b$ - - - $9_n$ without involving current sharing problems since during the charging cycle of the inductors such as $28_a$, $28_b$ - - - $28_n$ each circuit is isolated from its neighbours. In addition, the power level is flexible since any or all of the transistor stages $9_a$, $9_b$ - - - $9_n$ may be chosen not to be driven so as to reduce the power. In this last case the rectifiers $29_a$, $29_b$ - - - $29_n$ ensure isolation between the stages.

I claim:

1. A power supply arrangement in which a power source is connected to supply a load which requires varying amounts of electrical power, and comprising reservoir storage means for receiving a variable level of electrical energy from said source, charge control circuit means connected between said reservoir storage means and said source for varying the level of electrical energy transferred to said storage means, discharge control circuit means connected between said storage means and the load for supplying the load with the varying amounts of electrical power required thereby, and processor means, having a first input connected to said source, a second input connected to said storage means, a first output connected to said charge control circuit means and a second output connected to said discharge control circuit means, and programmed to monitor the state of said power source to determine its capability for providing power to said reservoir storage means and to control said charge control circuit to achieve optimum charging thereof and to control said discharge control circuit to supply power to said load as required and consistent with the state of charge of said reservoir storage means and the capability of said power source.

2. An arrangement as claimed in claim 1 and wherein said load is such that the power requirements thereof may at times exceed the power rating of said source.

3. An arrangement as claimed in claim 1 and wherein said load comprises a radio transmitting valve.

4. A power supply arrangement in which a power source is connected to supply a load and comprising reservoir storage means arranged to be charged via a charge control circuit from said source and to supply said load via a discharge control circuit and a processor programmed and arranged to monitor the state of said power source to determine its capability for providing power to said reservoir storage means and to control said charge control circuit to achieve optimum charging thereof and to control said discharge control circuit to supply power to said load as required and consistent with the state of charge of said reservoir storage means and the capability of said power source, said power source being connected to supply power to auxiliary equipments, and said processor being arranged to control the operation of an auxiliary and to switch this off where the power supplied thereto is required for said load and circumstances permit.

5. An arrangement as claimed in claim 1 and wherein said processor is arranged to control said charge control circuit in such manner that power is supplied to said load, or the power level of the power supplied to said load is increased, in pulse form.

6. A power supply arrangement in which a power source is connected to supply a load and comprising reservoir storage means arranged to be charged via a charge control circuit from said source and to supply said load via a discharge control circuit and a processor programmed and arranged to monitor the state of said power source to determine its capability for providing power to said reservoir storage means and to control said charge control circuit to achieve optimum charging thereof and to control said discharge control circuit to supply power to said load as required and consistent with the state of charge of said reservoir storage means and the capability of said power source, said processor being arranged to control said charge control circuit in such manner that power is supplied to said load, or the power level of the power supplied to said load is increased, in pulse form, said processor being arranged to control the amount of energy in a pulse and/or the pulse repetition rate and/or pattern in dependence upon the tasks to be performed by said load and on the basis of the state of charge of said reservoir storage means and the capability of said power source, reduce delay or sequence the tasks to be performed by said load in accordance with an order of priority and consistent with the power available.

7. An arrangement as claimed in claim 1 and wherein said discharge control circuit comprises a flyback inverter circuit including at least one inductive element connected to be charged from said reservoir storage means by a switch, when said switch is closed directly or indirectly under the control of said processor, and arranged such that the charge in said inductive member is transferred to said load as said switch is open under the control, direct or indirect, of said processor.

8. A power supply arrangement in which a source is connected to supply a load and comprising reservoir storage means arranged to be charged via a charge control circuit from said source and to supply said load via a discharge control circuit and a processor programmed and arranged to monitor the state of said power source to determine its capability for providing power to said reservoir storage means and to control said charge control circuit to achieve optimum charging thereof and to control said discharge control circuit to supply power to said load as required and consistent with the state of charge of said reservoir storage means and the capability of said power source, said discharge control circuit comprises a flyback inverter circuit including at least one inductive element connected to be charged from said reservoir storage means by a switch, when said switch is closed directly or indirectly under the control of said processor, and arranged such that the charge in said inductive member is transferred to said load as said switch is open under the control, said processor being arranged to close said switch following a pulse of energy applied to said load and flyback inverter action is initiated in order to replenish said reservoir storage means on a pulse to pulse basis.

9. An arrangement as claimed in claim 1 and wherein said load is provided with a temporary storage means from which said load draws energy as required and which is charged by said discharge control circuit.

10. A power supply arrangement comprising:
   (1) a power source having a power output;
   (2) first monitoring means adapted to monitor the state of said power source and to produce a first monitor signal indicating its capability of providing power;
   (3) a charge control circuit connected to receive power from the power output of the power source, the charge control circuit being adapted to receive a first control signal and having a power output to which the supply of power is controlled according to the first control signal;
   (4) reservoir storage means adapted to receive power from the output of the charge control circuit;
   (5) second monitoring means adapted to monitor the content of the reservoir storage means and to produce a second monitor signal indicating the said content;
   (6) a discharge control circuit connected to receive power from the power output of the charge control circuit and from the reservoir storage means, the discharge control circuit being adapted to receive a second control signal and having a power output to which the supply of power is controlled according to the second control signal;
   (7) a load connected to receive power from the discharge control circuit; and
   (8) means for generating the first and second control signals in dependence on a desired power consumption of the load and on the said monitor signals;

whereby the maximum possible power is supplied to the load when required for a limited period.

* * * * *